UNITED STATES PATENT OFFICE.

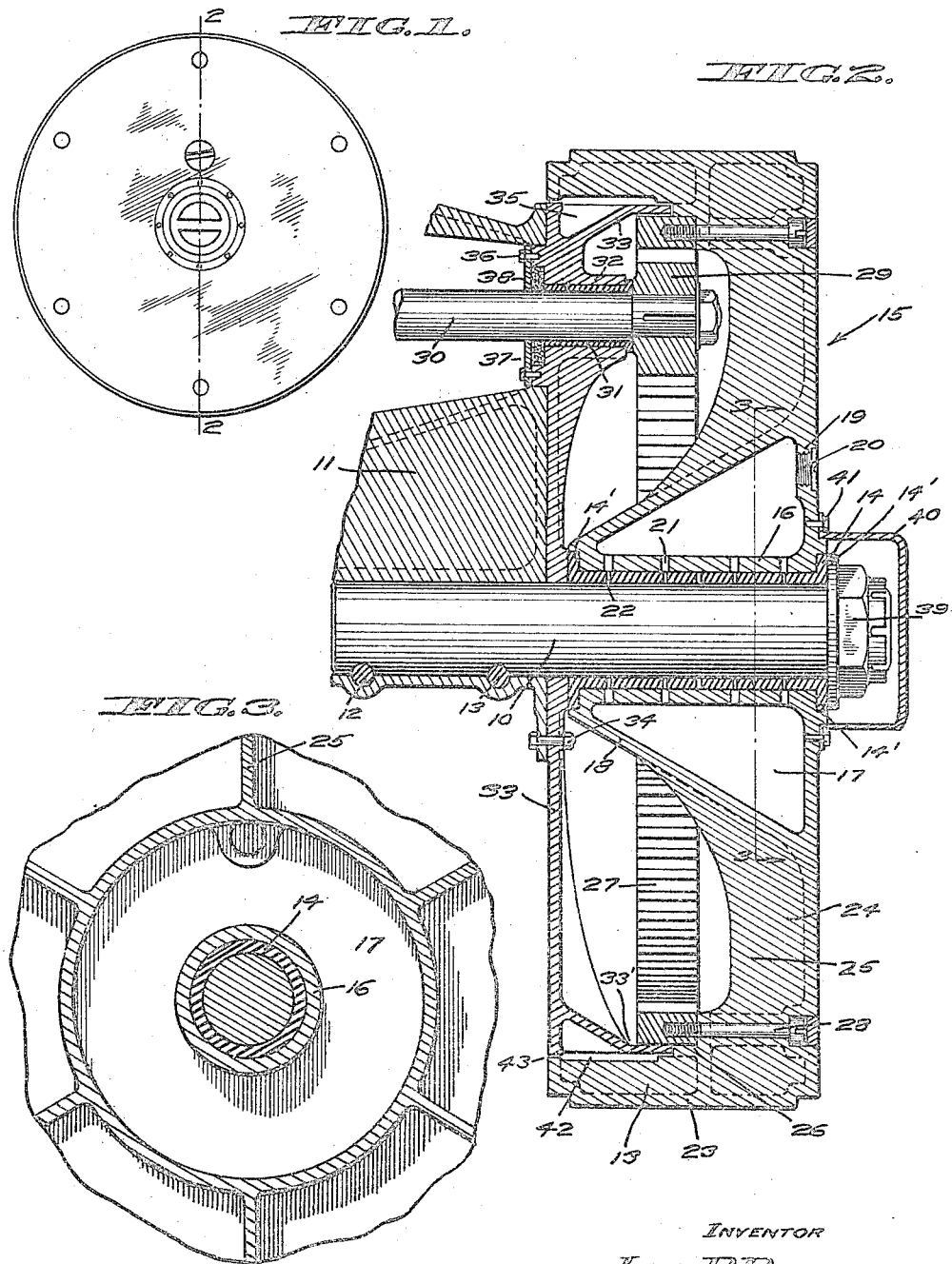

JOHN P. BARKER, OF GLENDALE, CALIFORNIA, ASSIGNOR, BY MESNE ASSIGNMENTS, TO HOMER MOTORS COMPANY, OF LOS ANGELES, CALIFORNIA, A CORPORATION OF ARIZONA.

SELF-LUBRICATING TRACTOR-WHEEL.

1,253,120.             Specification of Letters Patent.        Patented Jan. 8, 1918.

Application filed November 28, 1916. Serial No. 133,972.

*To all whom it may concern:*

Be it known that I, JOHN P. BARKER, a citizen of the United States, residing at Glendale, in the county of Los Angeles and State of California, have invented new and useful Improvements in Self-Lubricating Tractor-Wheels, of which the following is a specification.

This invention relates to a wheel and particularly pertains to a power driven wheel adapted for use upon tractor and other heavy duty motor vehicles.

It is the principal object of this invention to provide a power driven wheel for use upon heavy duty vehicles which is adapted to be individually driven and throughout which an adequate lubrication circulation is maintained so that all of the bearing faces of the wheel will be continuously lubricated.

Another object of this invention is to provide a tractor wheel of metallic construction which is so designed as to inclose its individual driving mechanism in a manner to shield it from dirt and dust which might otherwise become deposited therein to the detriment of the operating parts and their bearings.

Another object is to provide a tractor wheel having a self-contained oil reservoir adapted to surround the axle bearing and insure that it will be continuously and adequately lubricated.

It is a further object to provide a tractor wheel of the above class which is compact in its construction, and is so designed to be readily assembled or repaired.

Other objects will appear hereinafter.

The invention is illustrated, by way of example, in the accompanying drawings in which:

Figure 1 is a view in side elevation illustrating the outer face of a tractor wheel constructed in accordance with the present invention.

Fig. 2 is a view in vertical section as seen on the line 2—2 of Fig. 1, and illustrates the detailed construction of the wheel and its driving mechanism.

Fig. 3 is a view in transverse section as seen on the line 3—3 of Fig. 2 and illustrates the oil reservoir disposed around the wheel hub and its axle.

Referring more particularly to the drawings, 10 indicates a wheel spindle which is mounted within an axle casting 11 and withheld in rigid relation to said casting by means of bolts 12 and 13 which extend transversely of the spindle and register with notches formed in the lower side thereof. The spindle extends outwardly from the axle casting and serves as a mounting for an anti-friction bushing 14 upon which the wheel 15 is mounted. The wheel 15 is formed with a cylindrical hub 16 which provides an axle box which encompasses the bushing and is suitably held in fixed relation thereto so that the wheel and bushing will rotate in a unitary manner. As a means for permitting the bushing to be readily mounted within the hub, it is formed in two parts which are placed in position from opposite ends of the hub and held by means of enlarged end flanges 14 formed at the outer end of each bushing.

In order to insure that the wheel spindle and its bushing are adequately lubricated at all times, the hub 16 is designed to form the inner wall of an oil reservoir 17, which completely surrounds the hub and is inclosed by an outer wall 18. This reservoir is filled with a lubricant through an opening, normally closed by a screw plug 20. The hub is formed with a series of oil ducts 21 which are distributed throughout the wall of the hub and extend inwardly to communicate with oil ducts 22 formed through the bushing 14. By this means the oil reservoir is in communication at all times with the spindle of the wheel and thus provides it with adequate lubrication.

The wheel of which the hub 16 is a part is preferably constructed of metal and cast to form a tread or tire 23 which is supported by means of an integrally formed end wall 24. This wall forms the outer face of the wheel and is reinforced by radial ribs 25 which are cast integrally and disposed within the wheel. Formed within the wheel and concentric with the spindle thereof is an annular shoulder 26 adapted to provide a seat for an internal spur gear 27 which is secured in fixed relation to the wheel by means of a series of machine screws 28 extending inwardly from the outer face of the wheel in threaded engagement with the gear. This gear is provided as a driving gear for the wheel and is driven by a spur gear 29 in mesh with the internal gear 27 at a point above the axle and preferably in vertical alinement therewith. The gear 29 is suitably secured to rotate with a drive shaft 30.

The drive shaft 30 and its gear 29 are rotatably held within a fixed bushing 31 which is secured within a boss 32 formed as a part of a fixed circular back plate 33 adapted to inclose the opening in the rear face of the wheel. This plate is secured by means of bolts 34 to the axle housing 11 and has an inwardly extending annular flange 33′ which fits closely around the outside of the internal gear 27. By this means the driving mechanism of the wheel is incased in a dust-proof condition, and at the same time, permits free rotation of the wheel.

Lubrication of the driving shaft 30 is automatically provided by means of the oil which passes from the reservoir 17 and finally finds its way to the inner periphery of the tire will be gradually elevated as the wheel rotates and will finally seep onto the shaft. This oil will be retained within the wheel structure by means of the packing ring 37 which surrounds the drive shaft 30 and is secured by face plate 38. Reservoir pockets 35 are provided to store excessive quantities of the oil within the wheel as it passes from the reservoir.

In the assembly of the wheel, the bushing 14 is first slipped into position from opposite ends of the hub and thereafter placed over the spindle 10 in which position it is rotatably secured by means of a castellated nut 39 in threaded engagement with the end of the spindle. This nut is inclosed within a dust proof hub cap 40 secured to the outer face of the wheel by means of screws 41. The internal gear may be brought into engagement with its driving pinion 29 and the flange 33′ of the back plate 33 brought to encompass said gear in a manner to prevent dust from entering the wheel. Application of power to the shaft 30 will rotate the pinion 29 and thereby drive the wheel. This movement of rotation will act to cause oil to pass through the ducts 21 and 22 to the wheel spindle after which it will in part seep through the lower ducts back into the reservoir while a portion will pass around the end of the bushing 14 and out into the space occupied by the ear 27. This oil will then pass into the cavity 42 surrounding the internal gear. The action of the wheel in the course of its rotation will elevate this oil and deposit a part thereof within pocket 35 formed as a part of the back plate 33. The course of the oil from this point will be out upon the gear 29 onto the shaft 30.

It should be noted that oil will be collected in the annular cavity 42 around the inner face of the tire and that this oil will gradually seep out into the joint 43 between the tire and the stationary back plate 33 to form a seal which will prevent dust and dirt from passing into the wheel.

It will thus be seen that the traction wheel here described may be driven individually by a positive means of power transmission and may be adequately and continuously lubricated throughout in an automatic manner as the wheel rotates.

Thus I have produced a vehicle wheel comprising the combination with an axle of a hub having a concentric oil reservoir discharging to the axle, a filling plug for the reservoir, a cap secured to the hub over the end of the axle, a web extending from one end of the hub, a rim supported by the web and in line with the hub, a driving gear and pinion within the rim, a shaft for the pinion, and a back plate rigidly mounted to cover the gear and pinion and forming a close joint with the axle, the shaft, and the rim; so that oil may be supplied through the filling plug and it will lubricate the axle and work its way to the gear and pinion and to the joint between the rim and the back plate to provide lubrication and exclude dust.

While I have shown the preferred construction of my self-lubricating traction wheel as now known to me, it will be understood that various changes in the combination, construction and arrangement of parts may be made by those skilled in the art without departing from the spirit of my invention.

I claim:

1. The combination with a frame and an axle rigidly mounted in the frame, of a wheel comprising a hub mounted on the axle and having a closed outer end, said hub being formed with oil holes for supplying lubricant to the axle and having a web extending therefrom, and a wheel rim on the web; a gear fixed to the wheel, a shaft in the frame, a pinion on the shaft for driving the gear to drive the wheel, and a back plate rigid with the frame and forming a close joint with the axle, the shaft and the wheel.

2. The combination with a vehicle axle, of a hub having a reservoir discharging to the axle, a cap secured to the hub over the end of the axle, a filling plug for the reservoir, a web extending from the outer end of the hub, a rim on the web in line with the hub, a gear and pinion within the rim for driving the wheel, a shaft for the pinion, and a back plate rigid with the axle and forming a close joint with the axle, the shaft, and the rim, so that oil placed in the reservoir through the filling plug will lubricate the axle and then lubricate the gear and pinion and then lubricate the joint between the back plate and the wheel to exclude dust.

3. The combination with a vehicle axle, of a wheel having a hub on the axle, and an oil reservoir discharging to the axle, said wheel having an impervious web off-set to one end of the hub so as to form a chamber within the wheel rim, a gear and pinion within the chamber, a shaft for the pinion, and a back plate covering the gear and pinion and forming a close joint with the axle, the shaft and the wheel; so that oil placed in the reservoir will lubricate the axle, the gear and pinion and the joint between the back plate and wheel.

In testimony whereof I have signed my name to this specification.

JOHN P. BARKER.

Copies of this patent may be obtained for five cents each, by addressing the "Commissioner of Patents, Washington, D. C."